(12) United States Patent
Kumar et al.

(10) Patent No.: US 7,353,270 B2
(45) Date of Patent: Apr. 1, 2008

(54) MEDIA AND ADVERTISEMENT DISTRIBUTION AND TRACKING SYSTEM AND METHOD OF OPERATION THEREOF

(75) Inventors: Senthil Kumar, Chennai (IN); Jayendra Panchapakesan, CIT Colony (IN)

(73) Assignee: Real Image Media Technologies (P) Ltd., Chennai (IN)

( * ) Notice: Subject to any disclaimer, the term of this patent is extended or adjusted under 35 U.S.C. 154(b) by 928 days.

(21) Appl. No.: 10/032,508

(22) Filed: Oct. 27, 2001

(65) Prior Publication Data

US 2003/0084126 A1    May 1, 2003

(51) Int. Cl.
  G06F 15/173 (2006.01)
  G06F 15/16 (2006.01)
  H04N 7/16 (2006.01)
  H04N 7/10 (2006.01)

(52) U.S. Cl. .................. 709/224; 709/203; 725/1; 725/9; 725/32

(58) Field of Classification Search .......... 707/10; 709/203, 224; 725/1, 9, 32
See application file for complete search history.

(56) References Cited

U.S. PATENT DOCUMENTS 6,144,944 A * 11/2000 Kurtzman et al. ............. 705/14
6,256,554 B1 * 7/2001 DiLorenzo .................. 700/236
2001/0044855 A1 * 11/2001 Vermeire et al. ........... 709/310
2002/0046279 A1 * 4/2002 Chung ........................ 709/227
2002/0054087 A1 * 5/2002 Noll et al. .................. 345/744
2002/0073084 A1 * 6/2002 Kauffman et al. ............ 707/10
2002/0147634 A1 * 10/2002 Jacoby et al. ................ 705/14
2003/0056213 A1 * 3/2003 McFaddin et al. ........... 725/32
2003/0229893 A1 * 12/2003 Sgaraglino ................... 725/37

* cited by examiner

Primary Examiner—Jason D Cardone
Assistant Examiner—Tanim Hossain

(57) ABSTRACT

For use with a computer network, a media (perhaps music) and advertisement distribution and tracking system and a method of distributing and tracking media and advertisements. In one embodiment, the system includes: (1) a media server that distributes media to remote players via the computer network according to corresponding playback rules, (2) an advertisement server that distributes advertisements to the remote players via the computer network according to corresponding advertising schedules and (3) a tracking subsystem that retrieves as-run logs from the remote players via the computer network and generates media and advertisement play reports and advertisement billing reports therefrom.

17 Claims, 2 Drawing Sheets

QJam Overview Diagram

QJam Overview Diagram

MEDIA AND ADVERTISEMENT DISTRIBUTION AND TRACKING SYSTEM AND METHOD OF OPERATION THEREOF

TECHNICAL FIELD OF THE INVENTION

The present invention is directed, in general, to computer networks and, more specifically, to a media and advertisement distribution and tracking system and a method of operating such system to distribute entertainment and advertisements and track playing of the same at remote sites.

BACKGROUND OF THE INVENTION

Since at least the 1940s, jukeboxes have provided musical entertainment to patrons of diners, skating rinks, bowling alleys and bars. The classic jukebox, perhaps most typified by the iconic Wurlitzer®, contains a bunch of records, a written menu of songs to choose from, a coin slot in which to put your money and a song selector (usually a series of lettered or numbered buttons) that allows customers to select the songs they want to hear. Most jukeboxes not only give their customers music, but also a visual show in the form of colored lights or bubbling liquid and a chance to see the record of your choice being retrieved and loaded onto a turntable, all presented under glass.

As times have changed, so have jukeboxes. Later models have become somewhat less elaborate, trading eclectic details for utilitarian efficiency and a more low-key appearance. Gone, too, are the visible records, replaced with compact discs (CDS) of infinitely better quality, and perhaps far less style. In fact, since the mechanisms that load and play CDS are not as interesting to watch in motion, they are now often hidden.

The unfortunate result is that jukeboxes are neither as prominent nor as popular as they once were. Though they can still be found in all manner of commercial establishment, they may go hours without a single play. This lack of interest and finance will, over time, cause their demise.

In addition to the fading romantic aspects of jukeboxes are other disadvantages. First, jukeboxes are large, cumbersome units. Not only must they contain the records or CDS they are to play, but they must also contain the loading and playing mechanisms, which are often bulky.

Second, these records or CDS have to be rotated out over time. True, classic songs (so-called "oldies") never seem to age, but most songs are popular for only a while. Accordingly, people must be hired, trained and tasked with traveling to each establishment to change out records or CDS, update menus and collect quarters from coinboxes.

Third, these or other people must be trained to diagnose and repair broken jukeboxes. The same mechanisms that are so entertaining to watch in action are enormously complex, and therefore break down regularly. Maintaining these mechanisms in proper operating condition is a constant and expensive challenge.

Fourth, a given jukebox can hold only so many records or CDS. Therefore, the menu of songs to choose from is necessarily limited. If someone does not find the song he likes, he may walk away and not select another. Dissatisfied customers cannot help but hurt the revenue a jukebox is expected to make.

Finally, jukeboxes require their customers to pay to hear their music. A "play" costs only pocket change, but that is a lot of money to some customers. Other customers may be better heeled, but may not happen to have change on them at the time. Other customers just cannot be bothered.

Owners have a financial incentive to put a jukebox in their establishment, because they get a share of the profits. Unfortunately, as jukebox revenue has declined and operating expense has stayed high, the owners' shares have diminished. Unable to provide adequate compensation for establishment owners, jukeboxes are unlikely to continue to justify the space they require.

Accordingly, what is needed in the art is a fundamentally new kind of entertainment system to replace the venerable jukebox. More specifically, what is needed is a new system by which media (e.g., audio music, music videos, nonmusic entertainment or nonentertainment information) can be distributed and paid for.

SUMMARY OF THE INVENTION

To address the above-discussed deficiencies of the prior art, the present invention provides, for use with a computer network, a media and advertisement distribution and tracking system and a method of distributing and tracking media and advertisements. In one embodiment, the system includes: (1) a media server that distributes media to remote players via the computer network according to corresponding playback rules, (2) an advertisement server that distributes advertisements to the remote players via the computer network according to corresponding advertising schedules and (3) a tracking subsystem that retrieves as-run logs from the remote players via the computer network and generates media and advertisement play reports and advertisement billing reports therefrom.

The present invention therefore introduces the broad concept of employing a networked system to load remote players with media (e.g., audio music, music videos, non-music entertainment or nonentertainment information) and advertisements to allow the remote players to act as advertising-supported jukeboxes and retrieving as-run logs to allow an analysis of the media that has been played and to allow advertisers to be billed for playing their advertisements. It is highly advantageous that the remote players be entirely advertisement-supported, so that customers get their media for free.

The embodiment above is capable of facilitating remote players in providing an advertisement-supported media play service. In another embodiment of the present invention, the advertisement server may be omitted. Instead, some or all of the remote players may include a means for receiving a payment from the customer or the establishment. Cash or credit can therefore be employed to pay for media play in certain establishments.

In one embodiment of the present invention, the media server adjusts the playback rules based on the media play information. As one example, a song that is played often on one remote player and therefore popular at one particular establishment may be held over for a period of time, even though that song is replaced at other remote players in other establishments. Those skilled in the pertinent art should understand, however, that the media play information need not be taken into account when setting the playback rules.

In one embodiment of the present invention, the advertisement server adjusts the advertising schedules based on the advertisement play information. Advertisers are almost always involved in the process of determining when, where, how often, and in what context their advertisements are played. By retrieving advertisement play information from the remote players, the system of the present invention can modify advertising schedules. Of course, those skilled in the pertinent art should understand that the advertisement schedules could be independent of retrieved advertisement play information.

In one embodiment of the present invention, the playback rules include aspects selected from the group consisting of: (1) geographic location of the remote players, (2) establishment type in which the remote players are located, (3) demographics of establishment in which the remote players are located, (4) media playback history for the remote players, (5) time of day, (6) date, (7) day of week, (8) month of year and (9) season of year. Those skilled in the pertinent art should understand that other aspects could be reflected in the playback rules.

In one embodiment of the present invention, the advertising schedules are based on aspects selected from the group consisting of: (1) geographic location of the remote players, (2) establishment type in which the remote players are located, (3) demographics of establishment in which the remote players are located, (4) sequence, (5) proximity to particular media being played, (6) time of day, (7) date, (8) day of week, (9) month of year and (10) season of year. As with the playback rules, above, those skilled in the pertinent art should understand that other aspects could be reflected in the advertising schedules.

In one embodiment of the present invention, the advertising server comprises an interface that allows advertisers to upload the advertisements and modify the advertising schedules directly and to view ones of the media and advertisement play reports and advertisement billing reports. In an embodiment to be illustrated and described, the interface takes advantage of the World Wide Web.

In one embodiment of the present invention, the computer network is the Internet. Those skilled in the pertinent art should understand, however, that the computer network could be any suitable network that can couple the system to the remote players.

In one embodiment of the present invention, the system is capable of transmitting data regarding surveys, contests and the like to the remote players. This allows customers to give overt opinion feedback, perhaps regarding the media, the advertisements or the establishment in which a particular remote player is located. This further allows customers to take part in contests, perhaps to win prizes or credits at the particular establishment they are patronizing. Of course, this capability need not be present to fall within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
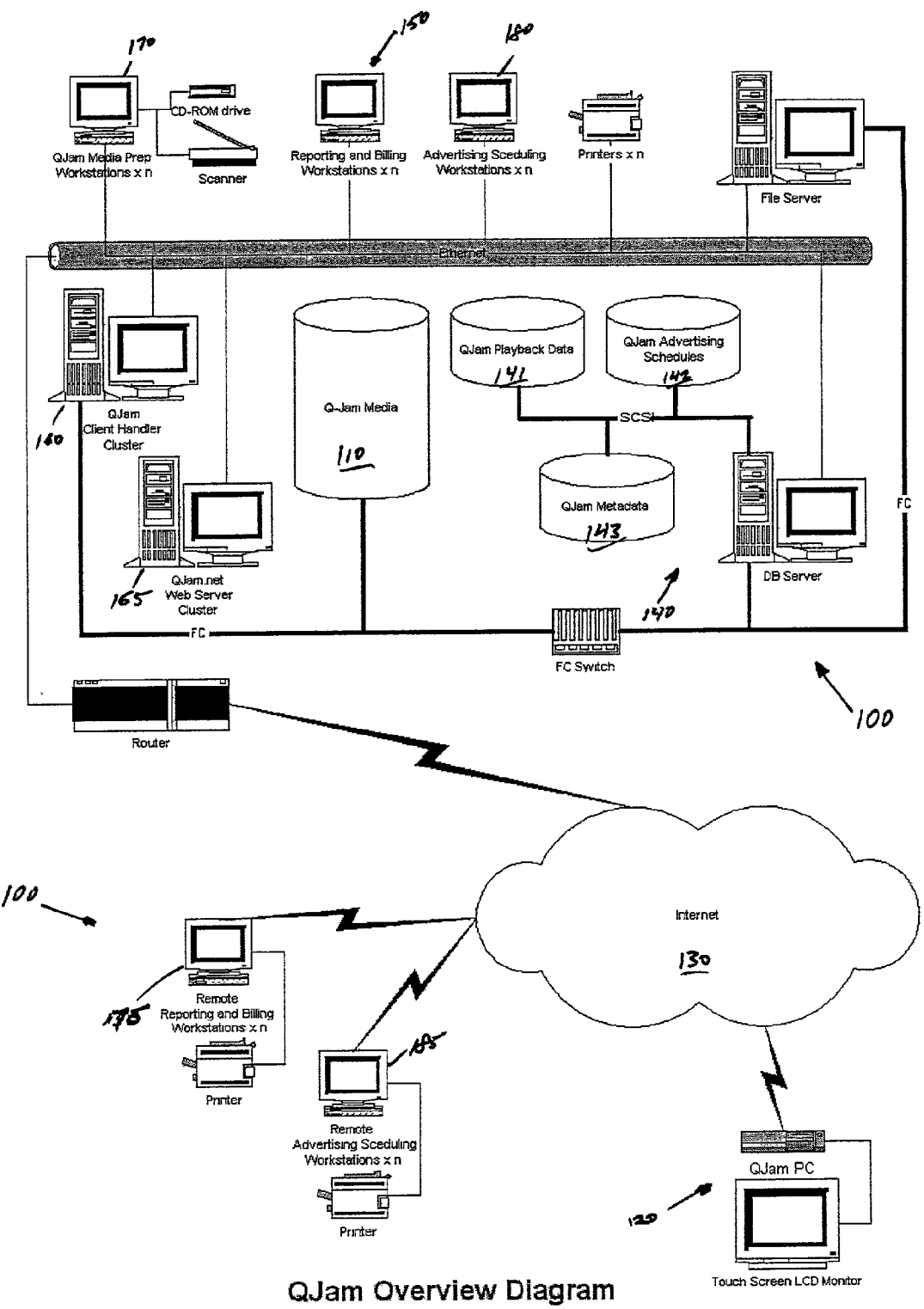
FIG. 1 illustrates a block diagram of a computer network including a media and advertisement distribution and tracking system constructed according to the principles of the present invention.

Referring initially to FIG. 1, illustrated is a block diagram of a computer network that includes a media and advertisement distribution and tracking system, generally designated 100, constructed according to the principles of the present invention. Though not pertinent to the scope of the present invention, the illustrated and described embodiment is given the name "QJam," which is simply a trademark that may be employed to designate the source of the system when it is commercially introduced.

The system 100 is illustrated as including a media server 110. The media server 110 stores "media." For purposes of the present invention, "media" is defined broadly to include audio music, music videos, nonmusic entertainment or nonentertainment information, such as text, graphics or computer data. Further, while the media contained in the media server 110 of FIG. 1 is meant to be entertaining, the broad definition of "media" includes informational or educational content, or any other content that may be desired to distribute to remote players. "Media" is not, however, defined to include advertisements, which are pitches for products or services that an advertiser pays to play. Implicit in this disctinction is that customers choose to play media and generally only tolerate the playing of advertisements.

The media server 110 is ultimately responsible for distributing its media to remote players, one of which is illustrated as a QJam personal computer (PC) 120. The media server 110 distributes its media to the remote players via a computer network 130 (which, in the illustrated embodiment, is the Internet) according to corresponding playback rules (to be described in greater detail below).

The remote players may be any type of hardware or software capable of playing the distributed media and advertising and returning as-run logs describing what they have played and when. In a preferred embodiment, the remote players are PC-based and employ a touch-sensitive screen and a graphical user interface (GUI) to display graphics and skins (described below), including menus and buttons, and receive customer selections.

The system 100 is further illustrated as including an advertisement server 140, which has associated databases that contain advertisement data (a QJam playback data database 141), advertising schedules (a QJam advertising schedules database 142) and metadata (a QJam metadata database 143) that assists in the distribution of the advertisements and the advertising schedules.

As with the media server 110, the advertisement server 140 distributes advertisements to the remote players (such as the QJam PC 120) via the computer network 130. The advertisement server 140 distributes the advertisements according to the corresponding advertising schedules (contained in the QJam advertising schedules database 142 in the illustrated embodiment and to be described in greater detail below).

The system 100 is further illustrated as including a tracking subsystem (illustrated as including a reporting and billing workstation 150). The tracking subsystem is responsible for retrieving as-run logs from the remote players (such as the QJam PC 120) via the computer network 130. Using the as-run logs, the tracking subsystem generates media and advertisement play reports and advertisement billing reports. These reports will be described in greater detail below.

FIG. 1 illustrates other things that may form part of the system 100. For example, the system 100 may include a client handler server cluster 160 and a web server cluster 165. The client handler server cluster 160 and the web server cluster 165 cooperate to fulfill requests by various terminals, such as the reporting and billing workstation 150, a QJam media preparation workstation 170, a remote reporting and billing workstation 175, an advertising scheduling workstation 180 and a remote advertising scheduling workstation 185.

The QJam media presentation workstation 170 can be employed to prepare media for loading into the QJam media database 110. This may involve audio or video recording, picture scanning or other processing that may be required to put the media in correct form. Though not separately designated, the QJam media presentation workstation may include a scanner and one or more CD-read-only memory (CD-ROM), CD read/write (CD-RW) or digital versatile disc (DVD) drives.

The QJam media presentation workstations 170 can also be employed to create the playback rules that govern how the media is distributed to the various remote players. As generally described above, the playback rules include aspects selected from the group consisting of: (1) geographic location of the remote players, (2) establishment type in which the remote players are located, (3) demographics of establishment in which the remote players are located, (4) media playback history for the remote players, (5) time of day, (6) date, (7) day of week, (8) month of year and (9) season of year.

It is anticipated that the remote players will be located in a wide variety of commercial establishments located over a wide geographical area, perhaps spanning many countries and continents. What is popular in an Akron, Ohio, bowling alley may not be appreciated in a Moscow, Russia, bar or a Nile Valley, Egypt, rest stop. What may be popular in the Akron, Ohio, bowling alley at Christmastime may be quite out of date in July. Revelrous nighttime videos in the Moscow bar may be inappropriate for the sober morning. Songs describing in-flight violence are wholly improper for airport terminals.

Accordingly, the playback rules are designed to govern (1) which media is loaded into which remote players and (2) when the media is loaded. For example, a remote player in an American college student union may receive a heavy dose of modern pop music (currently comprising Jennifer Lopez, Britney Spears and NSync). As particular songs by those artists come and go, and as new artists come into popularity, the playback rules are modified to cause corresponding new media to be loaded into that particular remote player. During December, several Christmas or Hanukkah songs may be in order and therefore incorporated into the playback schedule. Once the holidays are over, however, those songs will surely be supplanted with a less seasonal fare. Slower songs may be made available for weekday play than for weekend play (the better to study).

Playback rules can be dynamic. In one embodiment of the present invention, the media server adjusts the playback rules based on the media play information. As one example, a song that is played often on one remote player and therefore popular at one particular establishment may be held over for a period of time, even though that song is replaced at other remote players in other establishments. A Cole Porter song that has long since rotated out of most diners in the Baltimore, Md., area may still be wildly popular in one diner for reasons unknown. This fact can be ascertained and used to extend the run of that song. The as-run logs gives a history of media play, and can be employed to advantage to monitor the popularity of media or genres of media so playback rules can be adjusted to advantage.

Though more examples of location-, time- and feedback-dependent playback rules could certainly be given, those skilled in the art will understand from the above examples the nature and function of the playback rules. Particular embodiments of the present invention may include as many or as few playback rule types and playback rules as are felt to be necessary.

The QJam media server 110 may also serve as a skin server. In GUI parlance, a "skin" is the particular look and feel that an interface can present to a user. A given application, for example, may have several alternative "skins." Each skin usually presents the same information and user functions to a user, but may have a wholly different look. In this sense, a skin may be thought of as a personality.

It is fully contemplated that the remote players with which the system 100 interacts may have GUIs capable of taking on alternative skins. This can be highly advantageous in allowing the remote players to adapt or update their looks as appropriate. For example, some or all remote players could adopt a Valentine's Day skin on February 14 (perhaps an overall pink motif with red, heart-shaped touch-sensitive soft buttons). However, when Valentine's Day is over, the holiday skin is discarded in favor of a more generic skin, perhaps one directed more generally to winter.

The QJam media server 110, in its optional role as skin server, simply treats skins as a special type of media, distributing skins to the remote players according to skin selection rules. The skin selection rules, like the playback rules, may include aspects selected from the group consisting of: (1) geographic location of the remote players, (2) establishment type in which the remote players are located, (3) demographics of establishment in which the remote players are located, (4) media playback history for the remote players, (5) time of day, (6) date, (7) day of week, (8) month of year and (9) season of year.

The advertising scheduling workstations (including the advertising scheduling workstation 180 and the remote advertising scheduling workstation 185) can be employed to load advertising schedules into the QJam advertising schedules database 142.

In one sense, advertisements are like media. Accordingly, the advertising schedules may be based on aspects selected from the group consisting of: (1) geographic location of the remote players, (2) establishment type in which the remote players are located, (3) demographics of establishment in which the remote players are located, (4) time of day, (5) date, (6) day of week, (7) month of year and (8) season of year. In addition, however, advertisements may have additional considerations. Some sets of advertisements are episodic, and therefore should be played in sequence. Further, some advertisements are most effective when played in context or not played at certain times. Proximity to particular media being played may be one germane aspect. For example, an advertisement for a Slim Whitman album may be most effectively played proximate the playing of a requested Slim Whitman song. An advertisement for a skateboard may, however, not be demographically consonant with that same Slim Whitman song. Therefore, the advertising schedules contained in the QJam advertising schedules database 142 are determined based on advertising rules.

The advertising rules may be restrictive, preferential or nonrestrictive. In other words, one advertising rule may call for a particular advertisement not to be played at some times or under some circumstances (restrictive). Another advertising rule may prefer that a particular advertisement be played proximate the playing of some particular piece of media (preferential). Yet another advertising rule may allow an advertisement to be played anywhere at any time (nonrestrictive).

In deciding what the ultimate advertising schedules are to be, a person (manually) or the advertisement server 140 itself (automatically) assigns advertisements that are subject to the most restrictive advertising rules first, followed by those subjected to ever less restrictive advertising rules, and finally followed by those that are least restricted. Those skilled in the pertinent art will understand that the particular technique by which advertisements are assigned is not important to the present invention.

In fact, the advertisement server may adjust the advertising schedules based on the advertisement play information retrieved from the as-run logs of the various remote players. Advertisers are almost always involved in the process of determining when, where, how often, and in what context their advertisements are played. By retrieving advertisement play information from the remote players, the system 100 can optionally modify advertising schedules. Of course, those skilled in the pertinent art should understand that the advertisement schedules could be independent of retrieved advertisement play information.

The advertising server 140 comprises an interface that allows advertisers to upload the advertisements and modify the advertising schedules directly (via the advertising scheduling workstation 180 and remote advertising scheduling workstation 185).

With respect to the aforementioned media and advertisement play reports and advertisement billing reports, the system 100 includes the reporting and billing workstation 150 and the remote reporting and billing workstation 175. These, either separately or in concert operate to receive the as-run logs of the remote players and synthesize, from those logs, detailed reports of what media and advertisements were played at what time and on what remote player.

Analysis of these reports gives insight as to customer media preference and allows advertisers to be billed for advertisements played. The World Wide Web advantageously provides the medium by which an advertiser can gain access to these reports, can upload advertisements and can view advertising schedules. The web server cluster 165 may provide this function.

The various servers, clusters, workstations and networking hardware that join them together, along with operating system and application (such as database and transaction) software are conventional. In the illustrated embodiment, Microsoft® Windows® is the operating system of choice, though those skilled in the pertinent art will readily see that other operating systems are capable of supporting the system of the present invention.

Figure 2:
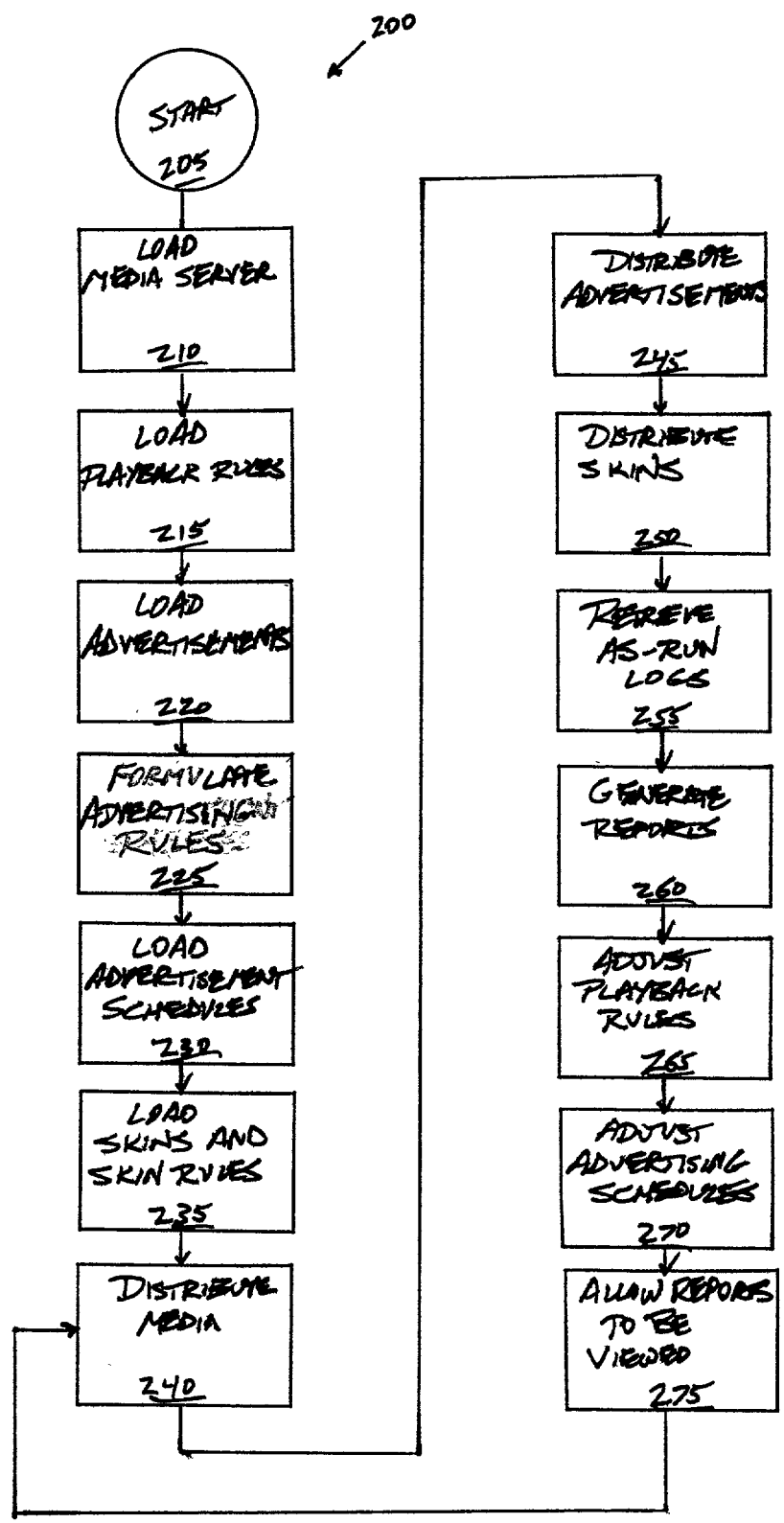
FIG. 2 illustrates a flow diagram of a method of distributing and tracking media and advertisements carried out according to the principles of the present invention.

Turning now to FIG. 2, illustrated is a flow diagram of a method, generally designated 200, of distributing and tracking media and advertisements carried out according to the principles of the present invention.

The method 200 begins in a start step 205, wherein it is desired to distribute media and advertisements to remote players via a computer network and track their playing. In a step 210, media (e.g., audio music, music videos, nonmusic entertainment or nonentertainment information) is created or converted into a form suitable for loading into a media server and then loaded into the media server.

Then, in a step 215, playback rules are loaded into the media server. The nature of these playback rules has been discussed at length above.

Next, in a step 220, advertisements are loaded into an advertisement server. Advertisers themselves may have direct access to upload their own commercials. Then, in a step 225, advertising rules are formulated and employed to build advertising schedules. In a step 230, the advertising schedules are loaded into an advertisement server. As above, advertisers themselves may have direct access to the schedules to modify them. The nature of these advertisement rules and advertisement schedules has been discussed at length above.

Then, in a step 235, skins and skin rules are loaded into a skin server. The nature of these skins and skin rules has been discussed at length above.

Next, in a step 240, the media is distributed to the remote players according to the corresponding playback rules. Then, in a step 245, the advertisements are distributed to the remote players according to the corresponding advertising schedules. Next, in a step 250, the skins are distributed to the remote players according to the skin rules.

In a step 255, as-run logs are retrieved from the remote players. It should be noted that it is advantageous to carry out the steps 240, 245, 250, 255 in a single session, perhaps initiated by each of the remote players at a predetermined or convenient time.

With as-run logs in-hand, media and advertisement play reports and advertisement billing reports can be generated in a step 260.

In a step 265, the playback rules may be adjusted based on the media play information. In a step 270, the advertising schedules may be adjusted based on the advertisement play information. In a step 275, the advertisers may be allowed to view ones of the media and advertisement play reports and advertisement billing reports to analyze play patterns and pay their bills.

The method 200 then returns to the step 240, wherein further media, advertising and skins are created, distributed and tracked as called for by the various playback rules, advertising schedules and skin rules, and advertisers are billed and pay for advertising played.

Although the present invention has been described in detail, those skilled in the art should understand that they can make various changes, substitutions and alterations herein without departing from the spirit and scope of the invention in its broadest form.

What is claimed is:

1. For use with a computer network, a media and advertisement distribution and tracking system, comprising:

remote players configured to store media for playback according to corresponding playback rules, wherein said playback rules define a stored and selected subset of playable media at said remote player for playback by an end user, to store advertisements for playback according to corresponding advertising schedules, and to store information corresponding to playback of said media and advertisements in as-run logs, at least one as-run log correlating to an aggregate behavior of a plurality of end users;

a media server that distributes said media to said remote players via said computer network according to said corresponding playback rules, wherein said media server adjusts said playback rules based on said as-run logs, wherein said playback rules govern:
a) which media is loaded into which remote players, and
b) when said media is loaded on said remote players,
wherein said corresponding playback rules further include an aspect of media playback history of said plurality of end users for at least one of said remote players;
an advertisement server that distributes said advertisements to said remote players via said computer network according to said corresponding advertising schedules; and
a tracking subsystem that retrieves said as-run logs from said remote players via said computer network and generates media and advertisement play reports and advertisement billing reports therefrom.

2. The system as recited in claim 1 wherein said advertisement server adjusts said advertising schedules base on said as run logs.

3. The system as recited in claim 1 wherein said playback rules further include aspects selected from the group consisting of:
geographic location of said remote players,
establishment type in which said remote players are located,
demographics of establishment in which said remote players are located,
time of day,
date,
day of week,
month of year, and
season of year.

4. The system as recited in claim 1 wherein said advertising schedules are based on aspects selected from the group consisting of:
geographic location of said remote players,
establishment type in which said remote players are located,
demographics of establishment in which said remote players are located,
sequence,
proximity to particular media being played,
time of day,
date,
day of week,
month of year, and
season of year.

5. The system as recited in claim 1 wherein said advertising server comprises an interface that allows advertisers to upload said advertisements and modify said advertising schedules directly and to view ones of said media and advertisement play reports and advertisement billing reports.

6. The system as recited in claim 1 wherein said computer network is the Internet.

7. A method of distributing and tracking media and advertisements over a computer network, comprising:
configuring remote players to store media for playback according to corresponding playback rules, wherein said playback rules defined a stored and selected subset of playable media at said remote players, to store advertisements for playback according to corresponding advertisements in schedules, and to store information corresponding to playback of said media and advertisements in as-run logs, at least one as-run log correlating to an aggregate behavior of a plurality of end users;
distributing media to said remote players via said computer network according to said corresponding playback rules;
adjusting said playback rules based on said as-run logs, wherein said playback rules govern:
a) which media is loaded into which remote players; and
b) when said media is loaded on said remote players;
wherein said playback rules further include aspects media playback history of a plurality of end users for at least one of said remote players;
distributing said advertisements to said remote players via said computer network according to said corresponding advertising schedules;
retrieving said as-run logs from said remote players via said computer network; and
generating media and advertisement play reports and advertisement billing reports from said as-run logs.

8. The method as recited in claim 7 further comprising adjusting said advertising schedules based on said as run logs.

9. The method as recited in claim 7 wherein said playback rules further include aspects selected from the group consisting of:
geographic location of said remote players,
establishment type in which said remote players are located,
demographics of establishment in which said remote players are located,
time of day,
date,
day of week,
month of year, and
season of year.

10. The method as recited in claim 7 wherein said advertising schedules are based on aspects selected from the group consisting of:
geographic location of said remote players,
establishment type in which said remote players are located,
demographics of establishment in which said remote players are located,
sequence,
proximity to particular media being played,
time of day,
date,
day of week,
month of year, and
season of year.

11. The method as recited in claim 7 further comprising allowing advertisers to upload said advertisements and modify said advertising schedules directly and to view ones of said media and advertisement play reports and advertisement billing reports.

12. The method as recited in claim 7 wherein said computer network is the Internet.

13. A music and advertisement distribution and tracking system, comprising:
remote players configured to store media for playback according to corresponding playback rules, wherein said playback rules define a stored and selected subset of playable media at said remote player for playback by an end user, to store advertisements for playback according to corresponding advertising schedules, and to store information corresponding to playback of said media and advertisements in as-run logs, at least one as-run log correlating to an aggregate behavior of a plurality of end users;

a media server that distributes music to said remote players via the Internet according to said corresponding playback rules, wherein said media server adjusts said playback rules based on said as-run logs, wherein said playback rules govern:
 a) which media is loaded into which remote players; and
 b) when said media is loaded on said remote players,
wherein said playback rules further include an aspect of media playback history of said plurality of end users for at least one of said remote players;

an advertisement server that distributes said advertisements to said remote players via the Internet according to said corresponding advertising schedules;

a skin server that distributes skins to said remote players via the Internet according to skin selection rules; and a tracking subsystem that retrieves said as-run logs via the Internet from said remote players and generates music and advertisement play reports and advertisement billing reports therefrom.

14. The system as recited in claim 13 wherein said advertisement server adjusts said advertising schedules based on said as run logs.

15. The system as recited in claim 13 wherein said playback rules further include aspects selected from the group consisting of:
 geographic location of said remote players,
 establishment type in which said remote players are located,
 demographics of establishment in which said remote players are located.
 music playback history for said remote players,
 time of day,
 date,
 day of week,
 month of year, and
 season of year.

16. The system as recited in claim 13 wherein said advertising schedules are based on aspects selected from the group consisting of:
 geographic location of said remote players,
 establishment type in which said remote players are located,
 demographics of establishment in which said remote players are located,
 sequence,
 proximity to particular music being played,
 time of day,
 date,
 day of week,
 month of year, and
 season of year.

17. The system as recited in claim 13 wherein said advertising server comprises an interface that allows advertisers to upload said advertisements and modify said advertising schedules directly and to view ones of said music and advertisement play reports and advertisement billing reports.

* * * * *